United States Patent [19]
Unger et al.

[11] Patent Number: 5,578,217
[45] Date of Patent: Nov. 26, 1996

[54] USE A SOLVENT IMPREGNATED CROSSLINKED MATRIX FOR METAL RECOVERY

[75] Inventors: Peter D. Unger, Morristown; Ronald P. Rohrbach, Flemington, both of N.J.

[73] Assignee: AlliedSignal Inc., Morris Township, N.J.

[21] Appl. No.: 346,809

[22] Filed: Nov. 30, 1994

[51] Int. Cl.⁶ .................................................. C02F 1/28
[52] U.S. Cl. ...................... 210/670; 210/679; 210/682; 210/684; 210/688; 423/24
[58] Field of Search .................................. 210/670, 679, 210/682, 684, 688; 423/21.5, 22, 24, 54, 63, 70, 89, 100, 139

[56] References Cited

U.S. PATENT DOCUMENTS

| | | | |
|---|---|---|---|
| 3,984,358 | 10/1976 | Nefedova | 260/2.1 R |
| 4,220,726 | 9/1980 | Warshawsky | 210/679 |
| 4,332,916 | 6/1982 | Thill | 521/25 |
| 4,374,204 | 2/1983 | Alexandrov | 521/28 |
| 4,423,158 | 12/1983 | Porath | 521/32 |
| 4,507,268 | 3/1985 | Kordosky et al. | 423/24 |
| 4,544,532 | 10/1985 | Kordosky et al. | 423/24 |
| 5,002,984 | 3/1991 | Rainer | 524/30 |

FOREIGN PATENT DOCUMENTS

| | | |
|---|---|---|
| 0085522 | 8/1983 | European Pat. Off. . |
| 9105859 | 5/1991 | European Pat. Off. . |
| 0445347 | 9/1991 | European Pat. Off. . |
| 9304208 | 3/1993 | European Pat. Off. . |
| 9312877 | 7/1993 | European Pat. Off. . |
| 9316204 | 8/1993 | European Pat. Off. . |
| 9512632 | 5/1995 | European Pat. Off. . |

OTHER PUBLICATIONS

Technology Profile, Brochure by AlliedSignal Inc. (1994).
"Hydrometallurgical Application of a Novel Porous Resin", Materials Research Society–Fall 1993 Meeting (Dec. '94) Boston, Published Abstract, P. Unger, et al.
Palley, et al., "Physical Testing" in *A Guide to Materials Characterization and Chemical Analysis*, by John P. Sibilia, Ch. 12, pp. 273–275 (1988).
Perry's Chemical Engineers' Handbook Sixth Edition, "Ion-Exchange and Absorption Equipment", by staff specialists and R. H. Perry et al., pp. 19–40 to 19–49 (1984).
"Hydrometallurgy in Extraction Processes", vol. II, by C. K. Gupta, et al., pp. 63–93 and 157–193 (1990).
Warshawsky, "Extraction with Solvent–Impregnated Resins" in *Ion Exchanged and Solvent Extraction*, chapter 3, pp. 229–309, (New York 1981); vol. 8.
Warshawsky, "Solvent–Impregnated Resins in Hydrometallurgical Applications," 83 Trans. Inst. Min. Metal C101–C104, (1974).
Flett, "Solvent Extraction in Copper Hydrometallurgy: a review", 83, Trans. Inst. Min. Metal, C30–C38 (1974).

*Primary Examiner*—Ivars Cintins
*Attorney, Agent, or Firm*—Michele G. Mangini

[57] ABSTRACT

A composition comprising a crosslinked, highly porous body derived from a water-soluble hydrogel polymer, said porous body being characterized in that it has an open-celled three-dimensional lattice structure, a density of less than about 1.0 g/cm³, a surface area of equal to or greater than about 300 m²/g, a compression strength of equal to or less than about 10 percent yield at 300 psi, and an average pore diameter of less than about 500 Angstroms, wherein said hydrogel polymer is selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof; and a metal extractant.

The composition may be used in removing and/or recovering metal ions from aqueous streams.

A process of recovering metal ions from an aqueous metal ion solution including the steps of impregnating a metal extractant within the porous body described above, contacting the aqueous ion solution with the impregnated porous body in order to remove the metal ions therefrom, and separating the ions from the impregnated porous body.

9 Claims, 5 Drawing Sheets

5,578,217

USE A SOLVENT IMPREGNATED CROSSLINKED MATRIX FOR METAL RECOVERY

BACKGROUND OF THE INVENTION

1. Field of the Invention

The present invention relates to a carrier impregnated with ion-specific liquid extractants, and a metal recovery process utilizing said impregnated carrier.

2. Description of the Prior Art

The concept of using porous resins as polymeric carriers for ion-specific liquid extractants has been known since the early 1970s. See S. Afr. Patent Application No. 5637 (1971), and A. Warshawsky, 83 Trans. Inst. Min. Metal. C101 (1974)["Warshawsky I."]. Typical concerns associated with using such solvent-impregnated resins include: 1) the possibility of solubility losses of the entrapped solvent; 2) the limitations of mass transfer due to limited interfacial contact with the treatment stream; and 3) the characteristics of the basic pore structure of the polymeric support. See A. Warshawsky, Ion Exchange and Solvent Extraction, Ch. 3, p. 229 (New York, 1981)["Warshawsky II."].

More specifically, the average pore diameter of suitable resins should be large enough to accommodate the organic extractant-complex, but not so large as to subject the immobilized extractant to excessive loss at elevated hydrodynamic pressure. Such resins should also exhibit little to no shrinking or swelling upon exposure to solutions of very different pH values and salt concentrations, which is a shortcoming associated with known resins such as styrenic polymer resins and stryene-divinylbenzene crosslinked resins. See Warshawsky II. at 229. Although solubility losses may be minimized by careful selection of extractants and diluents, the choice of the polymeric support plays the ultimate role in determining the commercial viability of a solvent/resin system.

Hydrometallurgy, the extraction of metals from aqueous solution, is a process that is gaining in importance as the quality of available metal-bearing ores in the world declines. See D. S. Flett, 83 Trans. Inst. Min. Metal., C30 (1974). In order to selectively extract metal ions from aqueous ore leachates, commercial hydrometallurgical operations currently utilize liquid-liquid (solvent extraction) processes. In general, these processes typically consist of a multi-stage mixer-settler section wherein the metal-bearing leachate is emulsified with an immiscible organic extractant. The organic and aqueous phases are then allowed to separate and the organic phase, now containing the extracted metal, is transferred to a stripping section in which the metal value is recovered for subsequent purification. These solvent extraction processes have several inherent limitations: (1) large capital investment is required for plant construction, (2) large losses of organic reagents are incurred by evaporation into the atmosphere, by entrainment due to poor phase separation, and by solubility of organic extractants in the aqueous phase, (3) phase separation is difficult or impossible at lower operating temperatures, and (4) relatively large equipment footprint is required.

It would be desirable to provide an improved, environmentally safe, metal extractive composition that exhibits not only a higher dimensional stability in various solvents but also has improved porosity characteristics to accommodate the needs of metal recovery applications. It would also be desirable to provide an economical, environmentally safe metal recovery process which maximizes the mass transfer contact area between the treatment stream and the extractant.

SUMMARY OF THE INVENTION

In accordance with the present invention, there is provided a composition comprising:

a) a crosslinked, highly porous body derived from a water-soluble hydrogel polymer, said porous body being characterized in that it has an open-celled three-dimensional lattice structure, a density of less than about 1.0 g/cm$^3$, a surface area of equal to or greater than about 30 m$^2$/g, a compression strength of equal to or less than about 10 percent yield at 300 psi, and an average pore diameter of less than about 500 Angstroms, wherein said hydrogel polymer is selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof; and b) a metal extractant.

Suitable metal extractants may be selected from the group consisting of cationic extractants, anionic extractants, neutral extractants and mixtures thereof.

Another aspect of this invention provides a process for recovery of metal ions from an aqueous solution containing metal ions comprising:

a) impregnating a metal extractant within a crosslinked, highly porous body derived from a water-soluble hydrogel polymer, said porous body being characterized in that it has an open-celled three-dimensional lattice structure, a density of less than about 1 g/cm$^3$, a surface area of equal to or greater than about 30 m$^2$/g, a compression strength of equal to or less than about 10 percent yield at 300 psi, and an average pore diameter of less than about 500 Angstroms wherein said hydrogel polymer is selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof to form a porous body impregnated with a metal extractant;

b) contacting said aqueous solution with said porous body impregnated with a metal extractant to remove metal ions from said aqueous solution; and c) separating said metal ions from said porous body impregnated with a metal extractant.

The porous body used in both the composition and the process of the present invention exhibits numerous beneficial properties, including rigidity, very large pore volume, high surface area, and excellent strength characteristics. Therefore, when the porous body is used in combination with the metal extractant, the possibility of losing the metal extractant or "solvent" component trapped therein during metal extraction is reduced, and the interfacial contact, and thus mass transfer, with the treatment stream is maximized. In addition, the composition of this invention has excellent dimensional stability regardless of the amount of exposure to solutions of varying pH and salt concentrations.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

As mentioned above, the present invention provides a composition comprising a highly porous, high-strength crosslinked bodies derived from hydrogel polymers and a metal extractive component.

Figure 1:
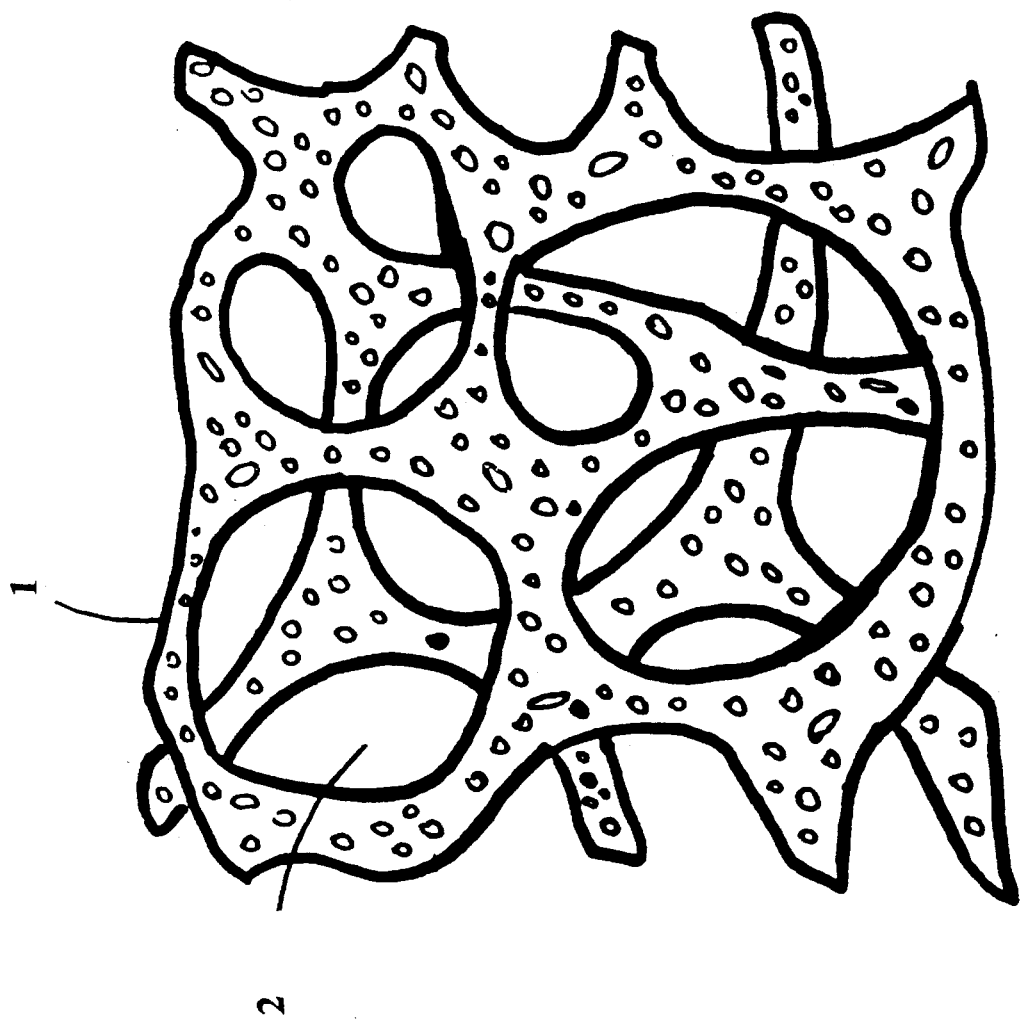
FIG. 1 is a schematic drawing which depicts a porous body used in this invention and its open-celled three-dimensional lattice structure.

Hydrogel polymers are water soluble polymeric materials that absorb water to form free-flowing gel-like substances, pregels. See related co-pending United States patent application Ser. No. 08/148,110 filed Nov. 4, 1993, which is a continuation-in-part of copending application Ser. No. 27,975 filed Mar. 8, 1993 which is a continuation-in-part of application Ser. No. 811,757 filed on Dec. 20, 1991 (now abandoned), all of which are incorporated by reference herein. The pregels are set or coagulated to form porous gels that are free-standing, and then crosslinked with an appropriate crosslinking agent to form the high-strength porous bodies used in the present invention. The porous hydrogel bodies have a three-dimensional open-celled lattice structure, for example, as illustrated in FIG. 1. The term lattice as used herein refers to an open framework of crosslinked polymer.

FIG. 1 depicts a section of the open-celled three-dimensional lattice of a porous body of this invention. The porous body 10 has pores 11, which form a continuous network of pores.

The porous hydrogel bodies of the present invention have a low density of less than about 1.0 g/cm$^3$, preferably less than or equal to about 0.5 g/cm$^3$, more preferably less than or equal to about 0.3 g/cm$^3$, and most preferably less than or equal to 0.2 g/cm$^3$. In other preferred embodiments, the density is equal to or less than 0.15 g/cm$^3$, and more preferably less than about 0.1 g/cm$^3$ or even less than about 0.05 g/cm$^3$. However, preferably, the bodies have a minimum density which is at least sufficient to maintain the three-dimensional lattice structure of the body. In many preferred embodiments of the invention, the bodies have a density of at least about 0.01 g/cm$^3$, and preferably at least 0.02 g/cm$^3$.

The porous bodies of this invention also have excellent surface area characteristics, which can play a substantial factor in the utility of porous bodies and articles formed therefrom. For example, their high exposed surface area, higher than that of other available materials, is available for attachment or adsorption of active agents and the like. An increase in surface area per unit weight of a material often minimizes the amount of material needed to perform a desired function. For example, the ability of a given amount of a material to perform as an adsorbent can be viewed as a function of the amount of adsorption per unit weight of the material. The more surface area per unit weight, the better the material will function as an adsorbent.

The present porous open-celled three-dimensional lattice bodies have a surface area of at least about 30 m$^2$/g, preferably at least about 50 m$^2$/g, and more preferably at least about 100 m$^2$/g. In particularly preferred embodiments, the surface area is at least about 150 m$^2$/g, more preferably at least about 200 m$^2$/g, and most preferably at least about 300 m$^2$/g.

The open-celled nature of the porous bodies of this invention can be further characterized in part by pore volume and pore diameter.

The present porous bodies have a pore volume of at least about 1 cm$^3$/g, preferably at least about 1.5 cm$^3$/g, and more preferably at least about 2.0 cm$^3$/g. In particularly preferred embodiments, the pore volume is at least about 2.5 cm$^3$/g, more preferably at least about 3.0 cm$^3$/g, and most preferably at least about 4.0 cm$^3$/g.

The pore diameter can vary substantially to achieve a given pore volume. Generally, the open-celled lattice structure of the porous bodies have an average pore diameter of at least about 50 Angstroms (A). In preferred embodiments, the average pore diameter is at least about 100 A, and more preferably at least about 200 A. In particularly preferred embodiments, the average pore diameter is at least about 250 A, preferably at least about 300 A, and most preferably at least about 350 A. In alternatively preferred embodiments, the average pore diameter ranges from about 50 A to about 500 A.

In alternative embodiments of the invention, the average pore diameter of the porous bodies can be varied to accommodate specific applications or screen different materials.

One method for controlling the average pore diameter of the present porous bodies involves changing their density as discussed further below. It is important to note that with decreasing density of the porous bodies, their average pore diameter tends to increase. Alternatively, the pore diameter can be controlled by employing a "ghost" mold or imprint technique. The "ghost mold" or imprint technique involves adding to the gel a material (prior to, during, or after gelation) which can later be removed from the gelled material. The ghost material leaves voids when removed. It can be removed by conventional techniques known in the art, such as dissolution or chemical etching.

In spite of their relatively low density, the bodies and articles formed therefrom possess beneficial strength characteristics. The crosslinked, open-celled three-dimensional lattice structure is believed to provide much of the strength. The porous bodies have a compressive strength such that the body does not fall apart or collapse when subjected to pressure. The porous bodies of this invention have a relatively low yield. Compressive yield corresponds to the stress-strain curve for a given amount of pressure applied to a material of known dimensions. This curve reflects the amount of compression resulting from the applied pressure. See Sibilia, *A Guide to Materials Characterization and Chemical Analysis* 273–275 (1988).

The porous bodies of the present invention have compressive strength equal to or less than 75% yield at 300 psi, preferably equal to or less than 50% yield at 300 psi, more preferably equal to or less than 25% yield at 300 psi, and most preferably equal to or less than about 10% yield at 300 psi. In alternative embodiments, the compressive strength is equal to or less than about 10% yield at 1000 psi.

The polymers suitable for the present invention are hydroxyl group-containing natural and synthetic polymers and other synthetic polymers that form hydrogels when solubilized in water or other aqueous solvents, such as aqueous acid or base solutions, and mixtures of water and organic solvents.

Suitable hydroxyl group-containing polymers include natural polymers such as polysaccharides, e.g. alginates, gums, carrageenan, starch, dextrins, chitosan and agar, proteins, e.g. gelatins, casein and collagen; synthetic polymers, e.g. polyvinyl alcohols, vinyl alcohol copolymers and starch/acrylate copolymers; and mixtures and copolymers thereof. Alginate is the general name give to alginic acid and its salts. Alginates are composed of D-mannosyluronic acid and L-gluopyranosyluronic acid residues, and are commercially harvested from seaweeds. Illustrative of suitable alginates are the alkali metal salts of alginic acid, and most preferred is sodium alginate. Gums are polysaccharides extracted from plants, and illustrative of suitable gums are guar gum and locust bean gum. Carrageenan is a colloid extracted from carrageen, and dextrins are polymers of D-glucose. Illustrative of suitable vinyl alcohol polymers are saponified polyvinyl acetate, preferably, having at least about 70 mol % of the acetate group hydrolyzed to be easily soluble in water, and suitable vinyl alcohol copolymers include vinyl alcohol/ethylenimine copolymers and vinyl alcohol/acrylate copolymers.

Other synthetic hydrogel polymers suitable for the present invention include acrylate polymers, polyalkylene amides, polyalkylenimides, polyacrylamides, and mixtures and copolymers thereof. Illustrative of suitable acrylate polymers are monovalent, e.g. $Na^+$, $K^+$, $Li^+$, $Cs^+$, or divalent, e.g. $Mg^{+2}$, $Ca^{+2}$, $Sr^{+2}$, $Ba^{+2}$, $Cu^{+2}$, $Cs^{+2}$, $Pb^{+2}$, $Zn^{+2}$, $Fe^{+2}$, $Ni^{+2}$, metal salts of polymers derived from acrylic acid, methacrylic acid, methyl methacrylic acid, ethyl methacrylic acid; and polymers derived from hydroxylethyl methacrylate, hydroxyethoxyethyl methacrylate, methoxyethyl methacrylate, methoxyethoxyethyl methacrylate, aminoethyl methoacrylate propylene, and glycol methacrylate. Suitable polyalkylenimides include polyethylenimide and the like.

Alginic acid is the hydrogel polymer which is preferably used in the present invention.

The starting concentration of the hydrogel polymer directly affects the density of the porous bodies. As the concentration of the polymer in the solution increases, the density of the porous body increases. An effective amount of gel-forming polymer is used. An "effective" amount is in the range of polymer concentrations between the minimum concentration which is high enough to form a gel and the maximum concentration which is low enough to be completely soluble in a gelling solvent. The effective amount of each polymer will vary with the selected density of the porous body. In general, the suitable concentration of the polymer for the present invention is between about 0.02% to about 15%, preferably between about 0.5% to about 12%, and more preferably between about 1% to about 10%.

In order to set or coagulate the polymer solution, hereinafter sometimes also referred to as "pregel", it may be necessary to utilize a gelling agent. Some gel-forming polymers do not require gelling agent, as discussed further below. In general, the polymer solution is exposed to an aqueous solution of an effective amount of gelling agent. The effective amount as used in this connection is the amount of gelling agent which is sufficient to set or coagulate the polymer solution such that its shape is maintained. Appropriate kinds and amounts of gelling agent will depend on the polymer. The gelling agents are well known in the art, and each gel can be prepared by conventional techniques known in the art.

Gelling of the polymer solution takes place over time. The amount of time required depends on the diffusion rate of the gelling agent. The gel's viscosity, which depends on the polymer concentration, generally dictates the length of time needed for the movement of the gelling agent throughout the gel. The higher the concentration of polymer, the longer the required diffusion time. Gelling may also involve a molecular rearrangement of the polymer. To some extent the rearrangement will occur simultaneously with the diffusion of the gelling agent through the gel, but it may also continue after complete diffusion of the gelling agent. It is believed that without diffusion of the gelling agent throughout the gel, shrinkage or collapse of the gel can occur during the downstream process steps of forming the porous bodies. With the onset of shrinkage, density may increase (as surface area decreases) to a point above a desired level.

The selection of gelling agent depends on the polymer utilized. The gelling agent can be any agent which is reactive with the polymer to set or coagulate the pregel. For alginate, an inorganic or organic cationic material is used to ionically bond the carboxylic acid moleties of the alginate polymer strands. Dicationic or polycationic materials are preferred for their ability to ionically bond the carboxylic acid moleties of two adjacent polymer strands. Sodium alginate can also be gelled using organic acids or inorganic materials, such as di- or polycationic metals. The organic acids used for gelling alginate, e.g. sodium alginate, can vary widely. Illustrative of such acids are acetic acid, propanoic acid, butanoic acid, benzoic acid, oxalic acid, malonic acid, succinic acid adipic acid, glutaric acid, maleic acid, phthalic acids and derivatives thereof. Preferably, a dicationic metal or dicarboxylic acid is employed in order to link two strands of the polymer together. Suitable cationic ions include ionic forms of and of the following: Al, Ba, Ca, Mg, Sr, Cr, Cu, Fe, Mn, and Zn. Most of the transition metals in the cationic form of $X^{2+}$ or more can also be employed. Preferably, the cationic metal is a cationic form of Ca, Ba or Cu.

For gums, gelling agents including sodium borate, inorganic acids, organic acids, such as boric acid, and bases are suitable.

Other polymers such as agar, carrageenan, gelatins and casein do not require any additional gelling agent, since they can be gelled by a heat treatment. The pregel solution is heated to a temperature high enough to melt the polymers, followed by cooling to form a gel. For example, an aqueous agar solution will form a gel upon heating to at least 80° C. and followed by cooling until gelation occurs.

Polyvinyl alcohol and starch/acrylate copolymers also do not require any agents or additional processes to form gels. They form gels when their aqueous solutions are exposed to an appropriate crosslinking solvent, such as acetone.

Rapid cooling is an alternative to using a gelling agent. This process may be used in addition to treatment with gelling agent or any other gelling technique. The rapid cooling technique involves forming a pregel or gel and dropping the pregel or gel into a solvent bath which has been cooled to a temperature at which the gelling solvent does not freeze, but at which the polymer coagulates. For hydrogel materials, generally, water alone is not suitable as a gelling solvent for the rapid cooling technique since water will freeze and will not diffuse out. Hence, a water/organic solvent mixture is used. In the case of alginate, a water/ethylene glycol (having at least about 25% ethylene glycol or organic solvent) can be used as the gelling solvent. The pregel or gel is then placed in a cooled bath of acetone, which then replaces the water/ethylene glycol solvent.

The gels can be fabricated into any desired shape. Shaping may be carried out by any conventional method known in the art. A polymer solution can be placed in a mold of any desired shape and then gelled in the mold. For example, a layer of a polymer solution can be placed on a flat surface to form a sheet; a polymer solution can be expressed through an aperture to form a filament fiber or tube, or it can be dripped into a gelling solvent to form granules. Any desired configuration (tubes, cubes, rectangular shapes, sphere, such as beads, pellets, sheets, which may be in the form of membrane) can thus be obtained.

In accordance with the present invention, the set or coagulated gels are further subjected to a crosslinking process to increase their physical strength and to preserve the porous structure of the gels. The gels are prepared for crosslinking by replacing the initial gelling solvent, i.e., water, with a crosslinking solvent. The gelling solvent can be replaced directly with a crosslinking solvent. Alternatively, if the crosslinking solvent is not miscible with the gelling solvent, one or more of intermediate solvents may be utilized. A suitable intermediate solvent is miscible with both gelling solvent and crosslinking solvent. The crosslinking solvent should also be non-reactive with the polymer and the crosslinking agent.

In general, the surface tension of the crosslinking solvent can be less than, greater than, or equal to the surface tension of the gelling solvent. Preferably, the crosslinking solvent has a surface tension substantially equal to the gelling solvent. This would obviate the necessity for solvent exchanges over a concentration gradient as discussed, infra. In alternative embodiments, the crosslinking solvent has a surface tension which is less than the gelling solvent. In such embodiments, the crosslinking solvent may have a surface tension which is less than or greater than that of the intermediate solvent. In more preferred embodiments, the crosslinking solvent has a surface tension which is less than about 75 dynes/cm. In further preferred embodiments, the crosslinking agent has a surface tension equal to or less than about 50 dynes/cm. In particularly preferred embodiments, the crosslinking solvent has a surface tension equal to or less than about 40 dynes/cm. In more particularly preferred embodiments, the crosslinking solvent has a surface tension equal to or less than about 30 dynes/cm.

Illustrative of crosslinking solvents useful for the present invention are acetone, chloroform, dimethyl sulfoxide, toluene, pyridine, and xylene. In many of the preferred embodiments, the crosslinking solvent is an aprotic organic solvent.

In general, the gelling solvent should be substantially, if not completely, removed from the gel prior to crosslinking if the selected crosslinking agent is reactive with the gelling solvent, as the reaction between the gelling solvent and crosslinking agent tends to diminish the crosslinks. For example, the water in a hydrogel polymer will react with a crosslinking agent such as tolylene diisocyanate (TDI). Replacement of the gelling solvent with a crosslinking solvent is generally referred to herein as a solvent exchange step. The actual exchange to the crosslinking solvent from the initial gelling solvent may comprise one or more exchanges of the gelling solvent with an intermediate solvent or solvents prior to replacing the intermediate solvent with the crosslinking solvent.

Preferably, the solvent exchange process comprises replacing the initial gelling solvent with an intermediate solvent of low surface tension, e.g. acetone. The intermediate solvent is selected such that is miscible with both the gelling solvent and with the subsequent intermediate solvent or the crosslinking solvent. Preferably, the intermediate solvent has a surface tension which is lower than that of the gelling solvent. In more preferred embodiments, the intermediate solvent has a surface tension of less than about 75 dynes/cm. In further preferred embodiments, the intermediate solvent has a surface tension equal to or less than about 50 dynes/cm. In particularly preferred embodiments, the intermediate solvent has a surface tension equal to or less than about 40 dynes/cm. In more particularly preferred embodiments, the intermediate solvent has a surface tension which is equal to or less than about 30 dynes/cm.

It is noted that if the crosslinking solvent has a surface tension greater than that of the gelling solvent and an intermediate solvent is used, then the intermediate solvent preferably has a surface tension which is less than the surface tension of the crosslinking solvent and greater than the surface tension of the gelling solvent.

If more than one intermediate solvent is used, then the intermediate solvent need only be miscible with the prior and subsequently used solvents. For example, water can first be exchanged with acetone, which is miscible both with water and with a subsequent crosslinking solvent such as toluene. Acetone is one of the preferred intermediate solvents for several reasons. Acetone is readily available and is relatively innocuous; it is also soluble in water and toluene. Other suitable intermediate solvents which may be used include alcohols, e.g. methanol, ethanol, propanol, and butanol; esters, e.g. methyl and ethyl acetate; ketones, e.g. methyl ethyl ketone; and others such as dimethyl sulfoxide, dimethylformamide, methylene chloride, ethylene chloride, tetrahydrofuran, dioxane, and the like.

As is known in the art, the pores of porous gels derived from hydrogel polymers collapse to form dense solids having a limited porosity when the gelling solvent is removed, i.e., when dehydrated. In addition, it has been found that when the gelling solvent is abruptly replaced with a crosslinking solvent having substantially different surface tension and polar characteristic, a large portion of the pores of the gels, especially fine pores, collapse to form less porous gels. The collapse of the pores not only significantly decreases the surface area and increase the density of the porous bodies, but also reduced their dimensional stability and physical strength. The collapsed pores prevent access of the crosslinking agent, resulting in uncrosslinked portions in the gel, which are free to swell and shrink.

In order to maintain the porous gel structure without causing shrinkage or collapse of the gel upon removal of the gelling solvent, care must be taken when replacing the gelling solvent with an intermediate solvent. Often, the use of a number of gradual solvent exchanges may be beneficial, using the same intermediate solvent at increasing concentrations. Such solvent exchange is herein referred to as solvent exchange over a concentration gradient. The concentration gradient is used to stepwise decrease the surface tension of the liquid within the gel. An effective concentration gradient is an interval of changes in concentration of intermediate or crosslinking solvent which prevents significant collapse of the gel structure and avoids substantial shrinkage of the gel. In general, though not necessarily, at least one solvent exchange is performed; many of the preferred embodiments employ more than one solvent exchanges. Desirably, the number of steps used and the amount organic waste generated in each batch of exchanges should be minimized. Intermediate waste can be reused, redistilled, or separated to recover the solvents.

For each solvent exchange step, sufficient time should be allowed for the replacement solvent to reach equilibrium. Equilibrium is the point at which the concentration of the replacement solvent inside the gel is in equilibrium with the concentration of the replacement solvent at the outer surface of the gel.

The intermediate solvents are usually a mixture of the intermediate solvent and the gelling solvent until 100% intermediate solvent is exchanged. The initial concentration of intermediate solvent (or crosslinking solvent, if no intermediate solvent is used), may contain from about 5 to about 25 volume % of the intermediate solvent, and thereafter the solvent exchanges over the concentration gradient can take place in increasing intervals of 10 volume % or higher.

In preferred embodiments, the intermediate solvent is initially employed in a concentration ranging from about 10 to 25 volume % and the concentration is then stepped up in intervals of from about 15 to about 25 volume %. The incremental increases of from about 20 to about 25 volume % are particularly preferred to minimize the number of solvent exchanges.

Once a substantially complete exchange of intermediate solvent for the initial gelling solvent has taken place, the intermediate solvent can generally be exposed directly to 100% of the crosslinking solvent. Although it is theorized that for most hydrogel polymers no gradient is required for the exchange from the intermediate solvent to the crosslinking solvent, there may be a situation where a concentration gradient is used for the exchange of an intermediate solvent and a crosslinking solvent.

Other techniques may be used to prepare the gel for crosslinking. These may be used in addition to or instead of the solvent exchange processes. Sometimes it may be preferable to perform at least one solvent exchange in connection with such techniques. Illustrative of such alternate techniques are freeze-drying and supercritical fluid extraction. Freeze-drying is advantageous since a solvent exchange procedure should not be necessary. On the other hand, a supercritical fluid extraction can also be beneficial since water can be exchanged by this method, with or without the need for intermediate solvent exchanges.

Freeze-drying is a well-known procedure which is frequently used in the food industry. The material to be freeze-dried is first cooled to below the freezing point of the solvent, followed by vacuum drying, as known in the art. The resulting freeze-dried hydrogel structure is directly placed in a crosslinking solvent to be crosslinked. Because the freeze drying process may not well preserve the porous gel structure, it may be necessary to add surfactants, elastomeric additives, or polyols to the pregel composition to prevent the collapse of pores during the freeze-drying process.

Super-critical fluid extraction involves extractions of the gelling solvent or intermediate solvent at high pressure using supercritical $CO_2$ in the liquid phase. Supercritical $CO_2$ is non-polar and can replace the solvent present in the gel. When the pressure is released, the $CO_2$ evaporates from the porous material. This technique can be used in a fashion analogous to that which has been described for the preparation of inorganic aerogels.

Following freeze-drying or supercritical extraction, the dried material is exposed to a crosslinking agent, which can be provided in solution or in the gas phase, to form a crosslinked porous body. The solvent for the crosslinking agent can vary widely. Such a solvent or gas acts as a carrier vehicle for the crosslinking agent. Obviously, the carrier vehicle should be inert to the gel material and capable of solubilizing the crosslinking agent. The supercritical fluid extraction method may be a preferable procedure for making materials of very low density materials, i.e. less than about 0.05 g/cm$^3$.

The choice of crosslinking agent will vary with the polymer, and the amount of crosslinking agent will vary with the amount of polymer present in the gel and the amount of crosslinking desired. The crosslinking agent must be reactive with the functional groups present in the polymer. The polymers suitable for use in the present invention have a variety of functional groups such as -OOH, -OSO$_3$, and -NH$_2$ on their polymer backbone, as well as hydroxyl functional group. Of these groups, the hydroxyl group is preferably targeted for the crosslinking process. The degree of crosslinkage can be varied to suit the needs of each application. The gradient solvent exchange process of the present invention that prevents the collapse of the gel pores can facilitate up to 100% crosslinking of all available functional groups present on the surface of the porous gels. The porous bodies of the present invention that are highly crosslinked exhibit high dimensional stability, minimal swellability, and excellent chemical integrity even when exposed to different solvents. Preferably, up to 75% of the functional groups of the hydrogel polymer are crosslinked; more preferably, up to 85% are crosslinked; and most preferably, up to 100% of at least one functional group of the hydrogel polymer is crosslinked. Since, as is known in the art, the maximum molar concentration of available functionalities can be empirically calculated for a given starting concentration of each selected polymer, the approximate amount of crosslinking agent needed to accomplish the desired level of crosslinkage can easily be determined.

A large number of well-known chemical crosslinking agents are available for use in the crosslinking step. Illustrative of suitable crosslinking agents are diamines and polyamines that crosslink the hydroxyl and/or carboxylic moieties along the hydrogel polymer backbone. For the purposes of this invention, diisocyanate compounds are preferred. The diisocyanate compounds can be aliphatic, cycloaliphatic, or aromatic. Aromatic diisocyanates, such as 2,4-tolylene diisocyanate, 4,4-diphenylmethane diisocyanate, and 1,4-phenylene diisocyanate, are exemplary of preferred embodiments. Other suitable agents for crosslinking the hydroxyl moiety include, for example, diacid halides, such as halide salts of adipic acid, glutaric acid or succinic acid, diepoxides, epichlorohydrin, aldehydes, dialdehydes, trimetaphosphates, vinyl sulfones, trimethylolmelamine, melamine-formaldehyde, urea-formaldehyde systems and di-halogenated aliphatics. Specific examples of such compounds include bis(hydroxymethyl)ethylene urea, N,N'-methylenebisacryl-amide, and 1,3,5-trichloro- and 1,3,5-triacryl s-triazine.

The crosslinking process takes place over time, and the amount of time required for crosslinking depends on the diffusion of the crosslinking agent throughout the gel. The crosslinking process may be conducted at any temperature above the freezing point and below the boiling point of the crosslinking solvent. Preferably, the crosslinking process is conducted at an elevated temperature below the boiling point of the crosslinking solvent in order to expedite the process.

Upon completion of the crosslinking process, the crosslinking solvent is removed from the gel bodies by a variety of conventional techniques, such as draining the liquid from the solid crosslinked product. Evaporation under vacuum is another suitable technique. Suitably, the solid crosslinked material is then dried under reduced pressure at a temperature of at least 20° C. to evaporate leftover solvents or volatile crosslinking agents from the crosslinked gel bodies.

The present porous bodies exhibit numerous beneficial properties including low density and high surface area as well as high pore volume and excellent strength characteristics. In addition, the porous bodies have excellent dimensional stability even after thorough dehydration and rehydration, especially at high levels of crosslinkage in such levels that are not possible to accomplish using the prior art solvent exchange processes. The numerous beneficial properties of the bodies provide a material with many uses, such as active-agent support materials.

A principal advantage of the porous bodies used in this invention and articles formed therefrom is the diversity of chemical modification which can be performed on the gel-forming prior to, during, or after isolating the open-celled porous cross-linked body. The abovementioned functional groups present in polymers suitable for use in the present invention can be chemically modified by employing conventional procedures. The number of functional groups available for chemical modification depends on the number of functional groups which have been involved in the crosslinking. With less crosslinking, more functional groups will be available for chemical modification. Alginic acid contains a substantial number of carboxyl groups, for example, which are easily derivatized by numerous reagents. Even if one crosslinks these materials using hydroxyl-specific reagents such as diisocyanates, sufficient free hydroxyls can survive the process intact and should be accessible for further reaction.

The porous body of the present invention are impregnated with metal extractants selective for the particular metal of interest. Examples of such metal extractants include cationic extractants, anionic extractants, neutral extractants, and mixtures thereof. Active metal extractants suitable for use in this invention are liquid complexing agents which preferably are homogeneously dispersed in the present carrier medium and exhibit a strong affinity to the carrier, i.e. the agent may be able to form strong bond or complexes with the functional groups, such as the hydroxyl groups, present throughout the surface of the carrier. Alternatively, hydrophobic interaction of the organic metal extractant with the crosslinked carrier body is sufficient to fix the metal extractant within the present carrier body, especially when the capillary forces of the pores within the crosslinked carrier body are considered.

Suitable extractants for use in the composition and process of the present invention may have cationic, anionic or neutral charges. See C. K. Gupta, et al Hydrometallurgy in Extraction Processes, 74–92 (1990)["Gupta"]. More specifically, a number of suitable acidic extractants having cationic charges are also characterized by their ability to chelate the metal ion, such as oxines, diketones, oximes including those described in U.S. Pat. Nos. 4,544,532 and 4,507,268, both of which are incorporated herein by reference, and the like and mixtures thereof, each of which contain both acidic and basic chemical functionalities. When these acidic extractants are contacted with target metals in solution according to the process of the present invention, the extractants and metals interact to form chelated salts. This interaction demonstrates the remarkable selectivity and affinity for metals possessed by these extractants. For example, hydroxyoxime extractants, such as those available from AlliedSignal Inc., Moristown, N.J., under the tradename "MOC", display a pH-dependent ability to selectively recover copper in the presence of ferric ion. Ketoximes are preferably used to form chelated salts in weak acid solutions, while aldoximes are more preferred when using strong acid solutions.

Other cationic extractants suitable for use in the present invention include non-chelating extractants such as alkyl carboxylic, phosphoric and phosphonic acids, wherein the alkyl group contains between about 1 to about 12, preferably between about 4 and 8 carbons. The interaction between non-chelating group extractants and target metals is more complex than that occurring with chelating group extractants but are generally based on charge relationships. Metal ions of such target metals are extracted in the order of their basicity, with improvements in extractability evident as the metal becomes more basic.

Another suitable class of metal extractants include the anionic extractants, such as the tertiary and quaternary amine agents selected from the group consisting of methyltricaprylylammonium chloride, methyltrioctylammonium chloride, 1-octanaminium, N-methyl-N,N-dioctylchloride, tricaprylmethylammonium chloride, tricaprylylmethylammonium chloride, and trioctylmethylammonium chloride. Such anionic extractants may be obtained from Henkel Corp., Minneapolis, Minn., under the tradenames "Aliquat" or "Alamine".

Also suitable are the neutral extractants, which include several solvating agents that function by coordinating with the metal in solution while simultaneously displacing water molecules associated with that metal. This interaction results in the formation of a neutral complex that is sequestered within the hydrophobic environment provided by the neutral solvent impregnated within the porous carrier body of the present invention. Examples of neutral extractants include tributylphosphate (TBP), methyl-iso-butyl ketone (MIBK), mixtures thereof, and the like.

A summary of the various classes of metal extractants including the manufacturers and typical uses, i.e. the type of metal which can be extracted from a particular solution using the given extractant, are provided in Tables 1–3. See also Gupta at 78–82.

TABLE 1

| CATIONIC EXTRACTANTS | | | |
| --- | --- | --- | --- |
| TYPE | TRADENAME | MFR | TYPICAL USE |
| NON-CHELATING | | | |
| Carboxylic acid | Napthenic Acid | Shell Chemical | Cu from Ni soln |
| Carboxylic acid | Versatic Acid | Shell Chemical | Cu from Ni soln |
| Phosphoric Acid | DEHPA | Mobil Chemicals | U from PSA soln; |

TABLE 1-continued

CATIONIC EXTRACTANTS

| TYPE | TRADENAME | MFR | TYPICAL USE |
|---|---|---|---|
| ("PSA") | | | Co from Ni soln |
| PSA | HOSTAREX PA-216 | Hoechst A.G. | Zn from soln; antimony, and other Group IIIB Metals ("Rare Earths") from soln |
| Phosphonic Acid ("PSNA") | PC-88A | Daihachi Chemical | Ni from Co soln; Rare Earths from soln |
| ("PSNA") | CYANEX CNX CYANEX 272 | Cytec Industries | Co from Ni soln |
| CHELATING | | | |
| oxime | Kelex 100 | Sherex Chemicals | Cu from soln |
| oxime | MOC 45 | AlliedSignal Inc. | Cu Extraction from solns; Cu or Ni or Co from Ammoniacal Soln. |
| oxime | LIX 64 | Henkel Corp. | Cu Extraction from solns; Cu or Ni or Co from Ammoniacal Soln. |
| oxime | LIX 63 | Henkel Corp. | Cu Extraction from soln |
| oxime | P-5000 Series | Acorga Ltd. | Cu Extraction from soln |
| β-diketone | Hostarex DK-16 | Hoechst, A.G. | Cu or Zn Extraction from Ammoniacal Soln. |
| β-diketone | LIX 51 | Henkel Corp. | Cu or Co from soln |
| β-diketone | LIX 54 | Henkel Corp. | Cu or Co from soln |

TABLE 2

ANIONIC EXTRACTANTS

| TYPE | TRADENAME | MFR | TYPICAL USE |
|---|---|---|---|
| Primary Amine | Primene JN-T | Rohm & Haas | Fe from Sulfate Soln. |
| Secondary Amine: n-laurylalkyl-methylamine | LA-1 & LA-2 | Rohm & Haas | U from Sulfate Soln; Co from Chloride Soln. |
| Secondary Amine: di-tridecylamine | Adogen 283 | Sherex Chemicals | U from Sulfate Soln; Co from Chloride Soln. |
| Tertiary Amine: tricaprylamine | Alamine 336 | Henkel Corp. | U or V or Mo or W from Sulfate soln. |
| Tertiary Amine: | Hostarex- A 327 | Hoechst A.G. | Co or Cu from Chloride soln, |
| Tertiary Amine: tri-isooctylamine | Adogen 364 | Sherex Chemicals | platinum, palladium, and the like ("PGM metals") from soln. |
| Quaternary Amine: methyltricapryl-ylammonium chloride | Aliquat 336 | Henkel Corp. | V or Cr or W or Cu from aqueous soln |
| Quaternary Amine: methyltricapryl-ylammonium chloride | Adogen 464 | Sherex Chemicals | Rare Earth Metals from soln. |
| Quaternary Amine: $(R_3N^+CH_3)Cl^-$ wherein R is an alkyl having from about 8 to about 10 carbons | Hoe S 2706 | Hoechst, A.G. | $Cr_2O_3$, $VO_5$, and other Oxyanionic Metals from soln. |

TABLE 3

NEUTRAL EXTRACTANTS

| TYPE | TRADENAME | MFR | TYPICAL USE |
|---|---|---|---|
| Phosphoric Acid Ester | TBP | Union Carbide Albright & Wilson Daihachi | Fe from Cl Soln U from soln.; Rare Earths from soln. |
| Phosphine | TOPO | American | Extraction of $U^{VI}$ |

TABLE 3-continued

NEUTRAL EXTRACTANTS

| TYPE | TRADE-NAME | MFR | TYPICAL USE |
|---|---|---|---|
| Oxide | | Cyanamid Albright & Wilson | from soln of $H_3PO_4$ with DEHPA |
| Methyl-isobutyl ketone | MIBK | N/A | Hf from Zr soln. Au from Cl Soln. |
| Alkyl Sulfides | Di-n-hexyl sulfides | N/A | Pd from Cl Solns. |

As used herein, "Oxyanionic metals" refers to complex oxygen-containing metal ions which carry a negative charge, such as chromic oxide, chromium(VI) trioxide, arsenic(III) oxide, vanadium(V) oxide, uranyl sulfate, uranyl nitrate, and the like.

Any active agent impregnating methods known in the art to be suitable for loading chromatographic resins may be employed to impregnate the carrier of the present invention. Illustrative of such methods include the dry impregnation method and the wet impregnation method. In the dry impregnation method, a diluted active agent is contacted with the carrier, then the diluent is slowly evaporated. This method is described in, for example, Warshawsky I., which is hereby incorporated by reference. In the wet impregnation method, an active agent, which is diluted in a precalculated amount of diluent, is contacted with the polymer carrier until the liquid phase is absorbed by the carrier. This method is described in, for example, Warshawsky II., which is hereby incorporated by reference.

In a preferred embodiment, the porous carrier is first thoroughly degassed using an organic solvent of low surface energy, such as acetone or hexane. Preferably, the porous body carrier is exposed to a volumetric excess, i.e. about 10% to about 150% and preferably about 25% to about 50%, of the selective metal extractant which may be dissolved in a suitable diluent, such as kerosene, at concentrations ranging from 10% to 99.99%, preferably 45% to 55%, based upon the total weight of the diluent and extractant. Modifiers may optionally be added to the solvent for the purpose of preventing the formation of the third phase and improving solubility of the metal complex. Examples of these modifiers include long-chain alkyl alcohols such as octanol or isodecanol, or other extractants belonging to the neutral category such as tributylphosphate (TBP). Other suitable modifiers include nonylphenol, 2-ethylhexanol and the like. Excess liquid is then removed from the impregnated resin by conventional filtration methods well known in the art. One skilled in the art can readily determine without undue experimentation that the solvent impregnated resin should be dried for a period of time sufficient to achieve the predetermined solvent content desired within the resin.

Small amounts of bulk liquid, i.e. less than about 4 liters (1 gallon) remaining in a thoroughly impregnated porous may be by pouring the wet impregnated resin slurry into a fritted funnel of coarse porosity fitted to a side-arm vacuum flask attached to a vacuum means generating a pressure of from about 64 KPa to about 78 KPa (about 19 to about 23 in. Hg). The excess bulk fluid is then allowed to be drawn into the flask by the application of vacuum. The partially dried impregnated porous carrier may then be further dried by placing the partially-dried material in a vacuum oven and heated to a temperature of about 30° to about 100° C. under a pressure of from about 64 Kpa to about 78 KPa (about 19 in. Hg to about 23 in. Hg ) for a period of time sufficient to achieve the desired degree of dryness. In a preferred embodiment, the porous carrier is dried to an extractant content of about 10 to about 15 percent, based upon the total weight of the impregnated body. The extractant content may then be determined using well known physical techniques such as thermogravimetric analysis.

At larger scales, a vessel such as a filter-dryer may be used to contact the extractant with the porous carrier, to draw off excess extractant from the carrier, and to dry the impregnated carrier. Periodic purging of the filter-dryer with a dry gas, such as an inert gas, i.e. nitrogen, helium, or argon is preferred during the drying process.

The resulting impregnated matrix is suitable for packing into an contactor having the appropriate format desired, such as a fixed bed, moving bed or batch contactor, under conventional methods known in the art. Such methods are described in, for example, Perry's Chemical Engineers' Handbook, 19–40 to 19–48 (New York, 5th Ed., 1973). A fixed-bed format is preferred in the present invention.

In the process of the present invention, an aqueous stream containing various metal salts is passed over the contactor in order to selectively remove a particular metal from the aqueous stream and thereby concentrate the metal within the porous matrix impregnated with the selective metal extractant. The aqueous stream may be fed, preferably without filtration or pretreatment and at ambient temperature, through the contactor in either an upflow or a downflow direction. Optionally, a jacketed column may be employed to allow thermostatting to the optimum temperature desired for a specific application. Examples of metal salts which may be removed from an aqueous stream include copper, cobalt, chromium (III & VI), cadmium, nickel, zinc, platinum, palladium, gold, radium, vanadium, lead, zirconium, hafnium, tin, tantalum, lanthanum, cerium, praseodymium, neodymium, promethium, samarium, europium, gadolinium, terbium, dysprosium, holmium, erbium, thulium, ytterbium, lutetium, and other transition elements. Other metal species which may be removed from aqueous stream include the rare earth elements. The extractant which is impregnated within the porous matrix defines the selectivity and affinity of the resin.

Nonmetallic components, and metals for which the metal extractant contained within the porous matrix has no affinity, pass unhindered through the contactor into the waste. The metals which were sequestered within the selective metal extractant impregnated within the porous matrix may be recovered by passing an appropriate solution, i.e. stripping solution, over the contactor. The nature of this stripping solution depends entirely on the type of metal extractant impregnated within the porous matrix and on the characteristics of the metal-ligand complex which forms between the metal and the selective extractant. One skilled in the art can readily determine which stripping solution to use. For example, copper ions which have been sequestered by a ketoxime metal extractant impregnated within the porous matrix may be stripped or displaced from the extractant by the use of aqueous sulfuric acid at a molar concentration of about 1.0 to about 2.0, preferably about 1.5 to about 1.75. The concentration of the dilute sulfuric acid need not be pure and thus may contain up to about 25 g/l of copper or other metals. Preferably, the sulfuric acid is diluted with water to about 100 g/l to about 200 g/l.

Other suitable stripping agents for acidic extractants may be selected from the group of inorganic acids including hydrochloric acid, phosphoric acid, perchloric acid and mixtures thereof. Dilute sulfuric acid is the preferred stripping solution for matrices impregnated with oxime extractants.

The family of tertiary and quaternary amine metal extractants may also be stripped using a broad range of generally basic salt solutions including ammonia, sodium hydroxide, sodium carbonate, sodium bicarbonate, ammonium chloride, ammonium nitrate, and mixtures of the above plus sodium chloride.

The metal extractant impregnated within the porous matrix may generally be stripped therefrom by modifications of procedures known in the art. One skilled in the art can readily optimize the process parameters, such as reagent concentrations, inclusion of scrubbing or washing stages, additives, temperatures and flow rates to strip the desired amount of metal extractant from the matrix.

The metal may be recovered from the metal-rich stripping solution by current commercial methods of metal recovery. For example, such well-known methods are described in Gupta, chapter 3. For example, copper may be recovered as copper metal ($Cu^0$) by the process of electrowinning, a widely used technique which is well known in the literature and industrial practice. Another common method for recovering copper from the metal-rich sulfuric acid stripping solution is by allowing the highly concentrated copper sulfate in the stripping solution to crystallize, and thereafter recovering the metal as crystalline copper sulfate.

The present composition and process may be useful in several applications wherein it is desirable to selectively recover or remove metals from an aqueous stream. Examples of such applications include, but are not limited to, the metal finishing industry, metal-bearing wastewater from industrial processes, hydrometallurgy, and environmental remediation of groundwater and bodies of water.

The composition and process of this invention overcome several problems encountered in prior art metal recovery processes. For example, one difficulty encountered by the prior art support mediums is that the support mediums have a low chemical affinity for the active agents. Thus, the agents are easily leached out of the support medium during normal use. Because the composition of the present invention employs a support medium having excellent characteristics, such as a large usable pore volume, appropriate average pore diameter, mechanical robustness, and negligible shrinking and swelling, as well as an appropriate surface chemistry, the support medium is capable of retaining the active agents over a longer period of time than the prior art support mediums. Therefore, when the present composition is incorporated in the process of this invention for separating metals from mixed aqueous streams, not only will the efficiency of metal removal be increased in comparison to that of prior art methods, but the claimed process will also advantageously run on a continuous basis for a longer period of time without replacing the impregnated matrix.

The following examples are merely illustrative of the present invention and should not be considered limiting in any way.

EXAMPLE 1: PREPARATION OF IMPREGNATED SUPPORT

A crosslinked, dry alginate resin (ground to about 0.42 mm to about 0.26 mm (40–60 mesh)) having a density of 0.152 g/cc was exposed to a volumetric excess of MOC™-45, a selective ketoxime copper extractant available from AlliedSignal Inc., Morristown, N.J. The mixture was then thoroughly degassed at a temperature of about 60° C. and a vacuum pressure of about 71 to about 84 KPa (21–25 inHg vacuum) for about 16 hours. The resulting impregnated resin was then dried to a predetermined solvent content of about 20 to about 30% based upon the total weight of the impregnated resin by exposure to constant air flow at ambient temperature and pressure on a fritted funnel for about 2 to about 16 hours. The dry, free flowing resin was then packed into glass columns of various dimensions.

The final bulk density of the impregnated resin was about 0.592 g/cc. The amount of ketoxime extractant in the impregnated resin was calculated to be about 74% based upon the volume of the impregnated resin was not measurably different than that of the crosslinked alginate starting material.

EXAMPLE 2: BREAKTHROUGH ANALYSIS

Copper breakthrough analysis was performed by passing a solution of 1 g/l copper sulfate over a jacketed, glass column (2.5 cm×30 cm) packed with about 140 to about 145 mL of impregnated resin, which was prepared as described in Example 1. The column, which was equilibrated at 32° C., was packed with a 0.42 mm to 0.26 mm (40–60 mesh) resin, and the copper sulfate solution flow rate therethrough was about 5.7 bed vols./hr.

The effluent therefrom was collected in one bed volume fractions. As used herein, "bed volume fractions" means a fraction size equal to one bed volume. Both colorimetric and atomic absorption spectroscopy analysis were used to determine the copper content of each fraction as described in Muller, R. H., et al., 28 Mikrochemie ver. Mikrochim. Acta 209 (1940) and Slavin, W., "Atomic Absorption Spectroscopy", 25 Chemical Analysis 102–104 (1968), respectively. Results of the copper breakthrough analysis are shown in FIG. 2.

Figure 2:
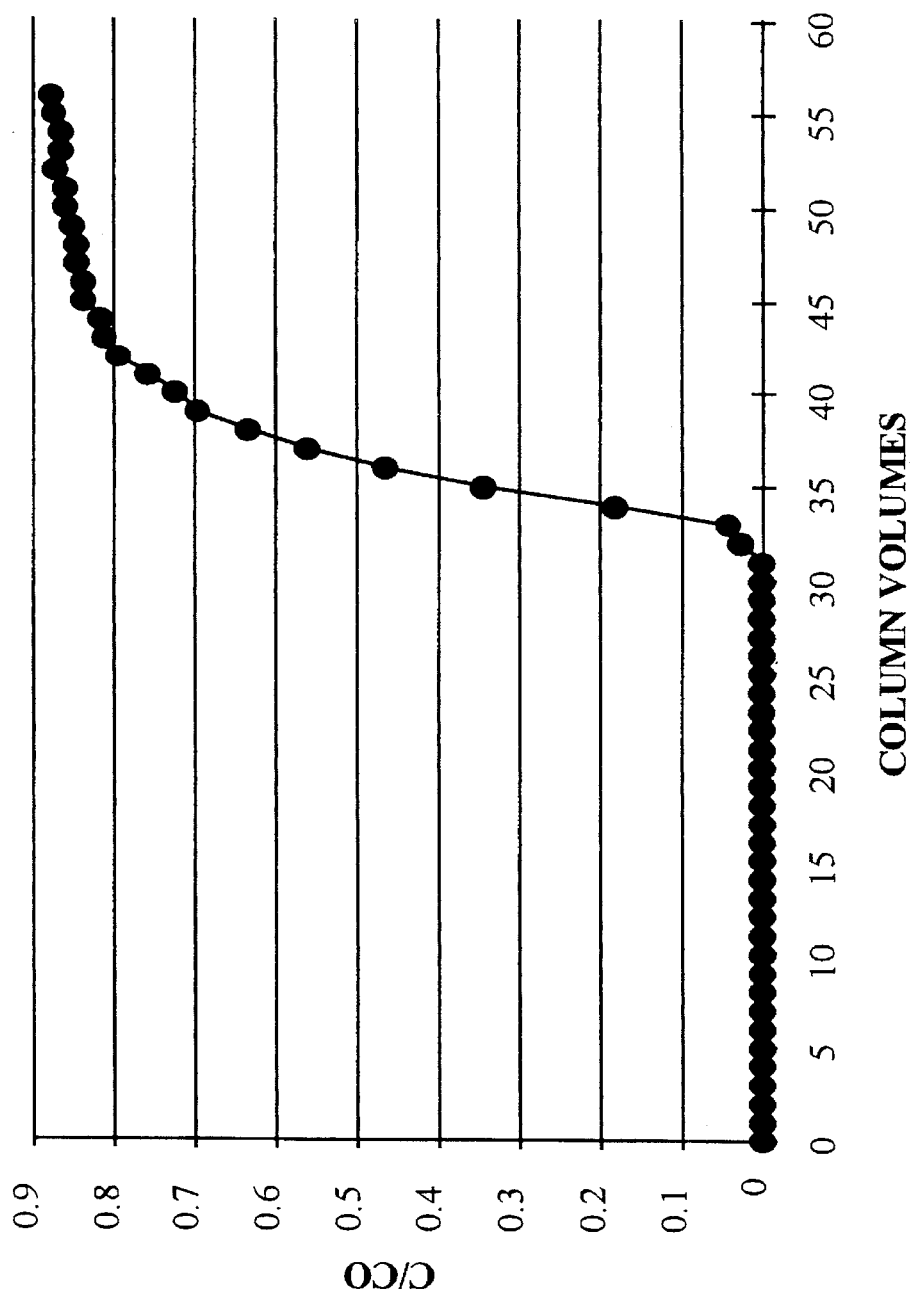
FIG. 2 is a graph which illustrates the copper breakthrough performance of the ketoxime-impregnated resin of Example 2 in terms of effluent copper concentration (C/Co), the ratio of the observed concentration to the feed concentration (1 g/l), versus column fraction volumes.

As seen in FIG. 2, the good chromatographic performance of the impregnated matrix is illustrated by the rapid rise in copper concentration in fractions 33–42. The copper capacity of the resin was found to be about 41.4 g Cu/liter of resin or about 8% by weight, which corresponds almost exactly to the theoretical capacity based on the amount of ketoxime immobilized in the column packing material. The capacity utilization, or the percent of total capacity achieved before significant copper rejection by the resin, is about 81%, which implicitly corresponds to good mass transfer performance.

EXAMPLE 3: STRIPPING ANALYSIS

The copper elution performance was determined by stripping the copper from a fully loaded column as described above in Example 2 using about 4 bed volumes of 1.75M sulfuric acid at 57° C. and a flow rate of about 5 bed vols./hr. Fractions of the acid effluent were collected and analyzed for copper content using methods described above in Example 2. Results of the stripping performance attained with the ketoxime-impregnated resin are shown in FIG. 3.

Figure 3:
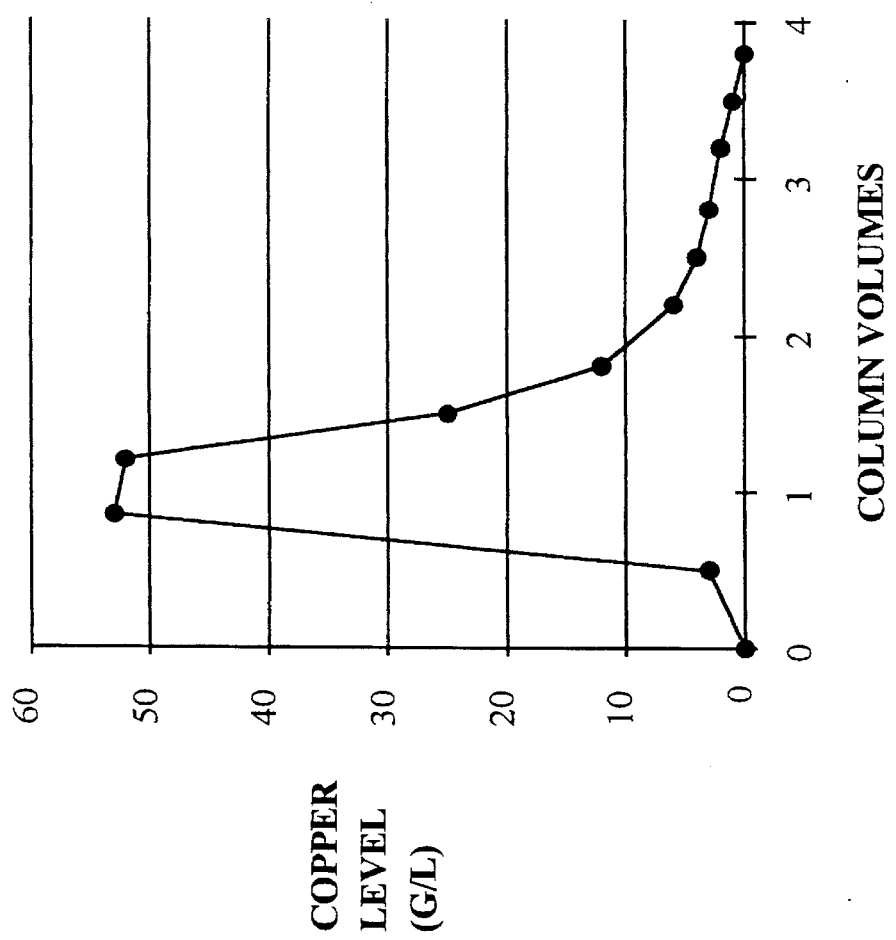
FIG. 3 is a graph which illustrates the stripping performance of the impregnated resin of Example 3 in terms of copper level (grams-copper/liter of acid) versus column fraction volumes.

It can be seen from FIG. 3 that more than 90% of the copper bound to the resin may be recovered in less than 1 column volume of acid effluent. Further, the peak copper concentration observed exceeded 53 g/l, and the concentration of copper in pooled fractions 2–5 was greater than 35 g/l. This performance exceeds the requirements for ultimate copper recovery by electrowinning.

EXAMPLE 4: RESIN LONGEVITY STUDY

The expected lifetime of the impregnated resin was estimated by subjecting the resin material to many hundreds of cycles of simulated operation. As used herein, "cycle" means the exposure of impregnated matrix to a copper containing solution followed by exposure to an acid solution at a flow rate of 8.5 bed volumes/hr. The total duration of each complete cycle of loading and stripping was fifteen minutes.

A 1 cm×10 cm jacketed glass column containing about 8 mL of a hydrophobic polymeric support composed of a polysaccharide backbone highly crosslinked with tolylene diisocyanate and impregnated with the extractant of Example 1 was exposed to: 1) five hundred cycles of water and sulfuric acid; 2) five hundred cycles of 1 g/l copper sulfate and 1M sulfuric acid; and 3) 700 cycles of acid leach solution (2.4 g/l copper sulfate, 4.5 g/l ferric sulfate, pH 2.1) and lean electrolyte (25 g/l copper sulfate in 1.75M sulfuric acid). The copper capacity of the resin was checked at 100 cycle intervals in order to monitor resin performance. A Cole-Parmer computer-controlled pump system integrated with solenoid-driven valves was used for cycle timing and flow generation. Results of the resin longevity study are shown in FIG. 4.

Figure 4:
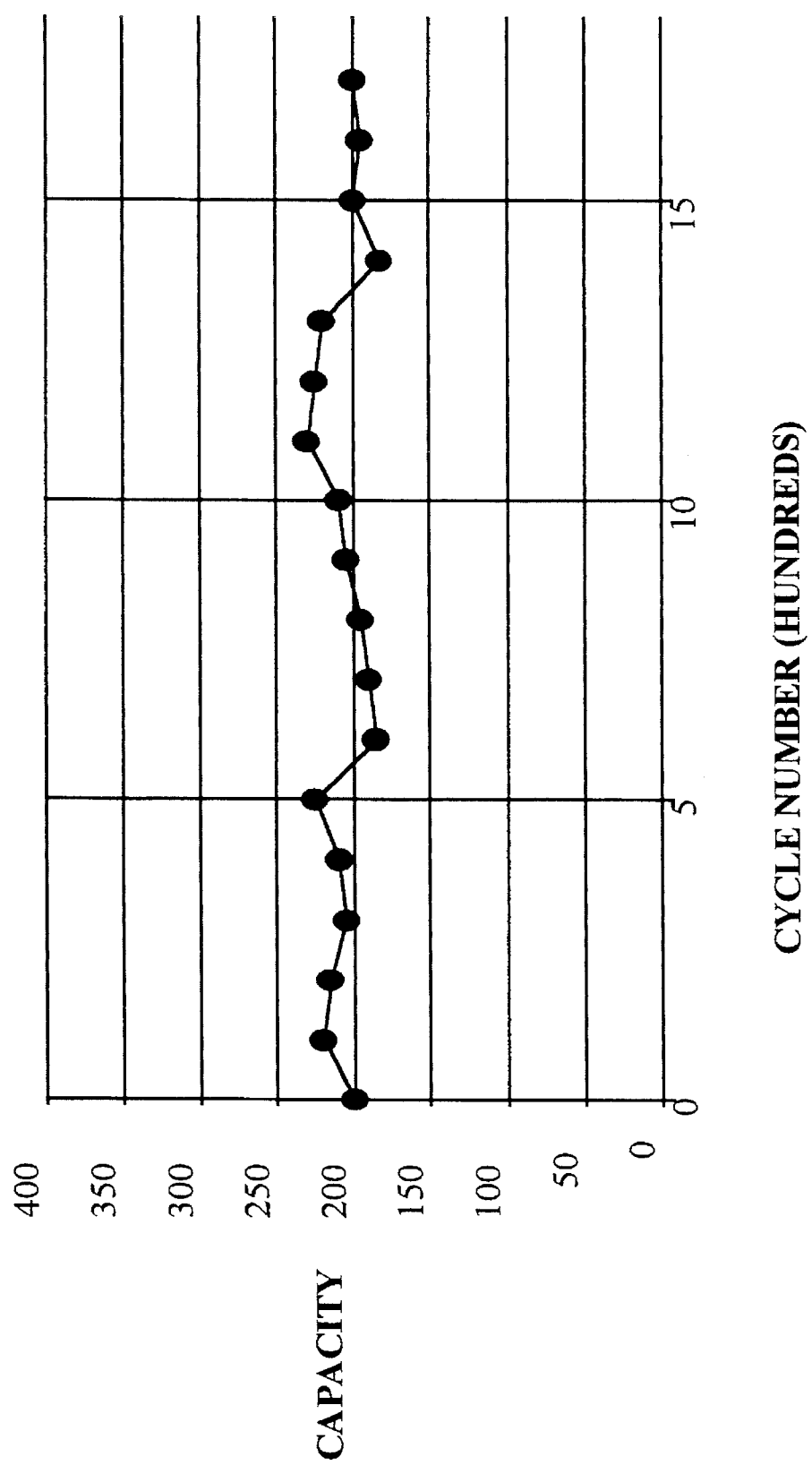
FIG. 4 is a graph which illustrates the results of the longevity study the impregnated resin described in Example 4 in terms of copper capacity of the resin versus cycles (hundreds) of simulated recovery operation.

It can be seen from FIG. 4 that no consistent loss of copper capacity occurred after 1,700 complete cycles of loading and stripping. The total on-line service duration of this column was more than five months. It is believed that much of the observed longevity of the impregnated resin system may be ascribed to the nature of the interaction between the organic metal extractant and the hydrophobic crosslinked polymer support. The ketoxime extractant is also highly hydrophobic in nature, and as such demonstrates a large affinity for the polymeric support relative to the aqueous feed solution.

As a result of the hydrophobic interaction between the metal extractant and the polymeric support, an extremely small amount of the extractant was lost into the column effluent. Initial solubility losses were on the order of about 1 ppm, based on total organic carbon analysis. After equilibration, the organic loss into the effluent was found to be below detectable limits (<<0.5 ppm).

EXAMPLE 5: PRESSURE DROP CHARACTERISTICS

A column (2.5 cm×100 cm) packed with a 0.42 mm to about 0.26 mm resin impregnated as described in Example 1 was equipped with pressure gauges at both the inlet and the outlet in order to determine the back pressure generated at various flow rates. The total packed bed depth of the column was about 1 meter.

Water was pumped in the down flow direction at flow rates of about 0.118–0.365 m/sec (2.75 to 8.5 gallons per min./foot$^2$ or 7.1 to 21.9 bed vols./hr).

Figure 5:
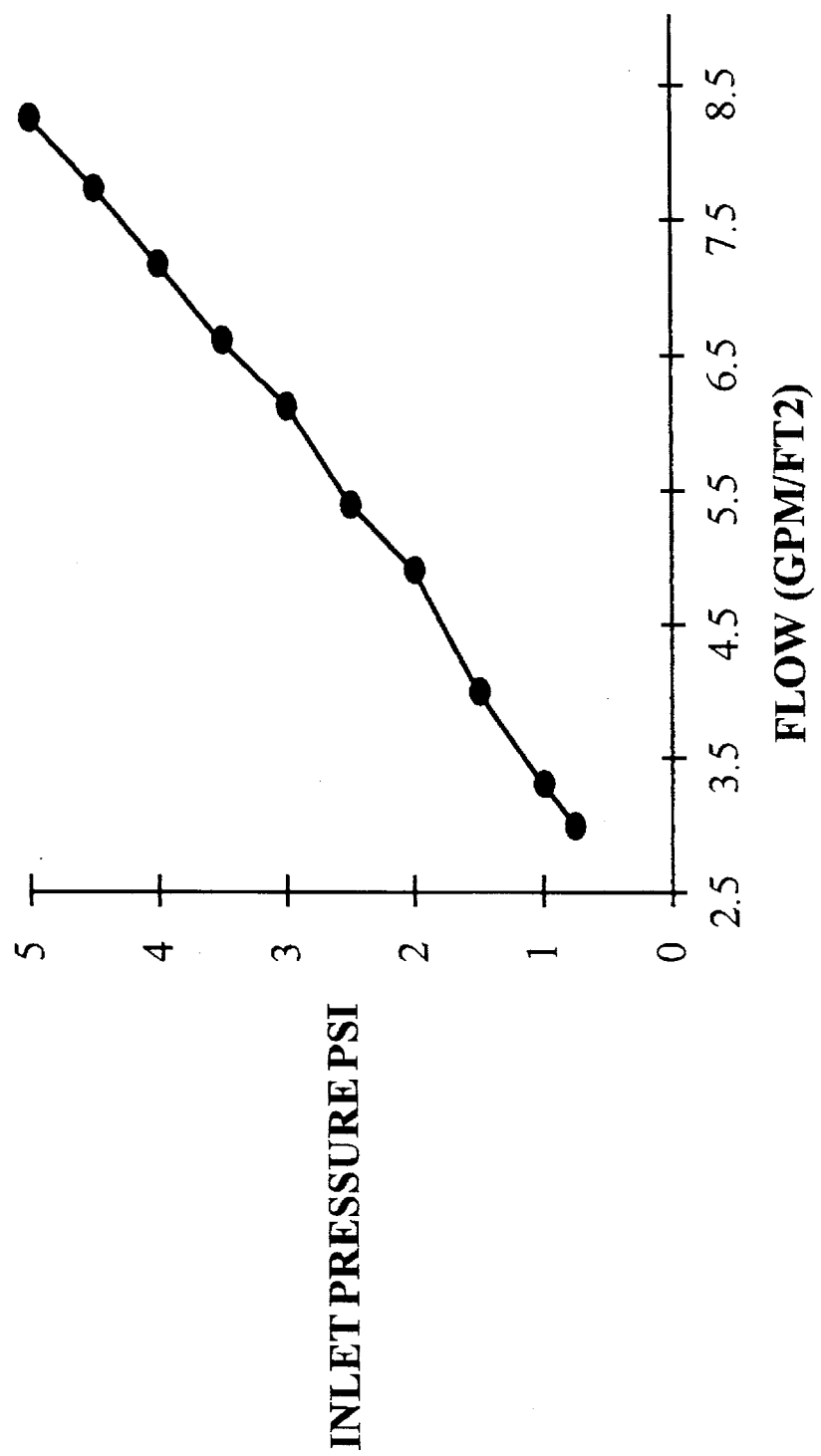
FIG. 5 is a graph which illustrates the pressure drop characteristics of the impregnated resin of Example 5 in terms of inlet pressure (psi) versus flow rate of the treatment water (gpm/ft$^2$).

Pressure drop characteristics of the impregnated resin are shown in FIG. 5.

It can be seen in FIG. 5 that a back pressure of only about 3 psi was observed in the column at nominal flow rates of 15 bed vols./hr. (6 gpm/ft$^2$). Thus, it is not anticipated that excess back pressure will be a limiting factor in the design of commercial large-scale columns.

It can be seen that the composition of this invention provides for the effective removal of metal ions from aqueous solutions containing metal ions. It can further be seen that the process of this invention can run on a continuous basis for a considerable period of time without replacing the porous body, without losing a significant amount of extractant trapped within the porous body and without sacrificing the mass transfer capabilities of the composition used therein.

We claim:

1. A process for recovery of metal ions from an aqueous solution containing metal ions comprising:
   a) impregnating a metal extractant within a crosslinked, highly porous body derived from a water-soluble hydrogel polymer, said porous body being characterized in that it has an open-celled three-dimensional lattice structure, a density of less than about 1 g/cm$^3$, a surface area of equal to or greater than about 30 m$^2$/g, a compression strength of equal to or less than about 10 percent yield at 300 psi, and an average pore diameter of less than about 500 Angstroms wherein said hydrogel polymer is selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof to form a porous body impregnated with a metal extractant;
   b) contacting said aqueous solution with said porous body impregnated with said metal extractant to remove metal ions from said aqueous solution; and
   c) separating said metal ions from said porous body impregnated with said metal extractant.

2. The process of claim 1 wherein said extractant is selected from the group consisting of diketones, oximes, oxines, tertiary amines, quaternary amines and mixtures thereof.

3. The process of claim 1 wherein said extractant is selected from the group consisting of methyltricaprylylammonium chloride, methyltrioctylammonium chloride, 1-octanaminium, N-methyl-N,N-dioctyl-, chloride, tricaprylmethylammonium chloride, tricaprylylmethylammonium chloride, and trioctylmethylammonium chloride.

4. The process of claim 1 wherein said metal ions are separated from said porous body by passing a stripping solution over said porous body.

5. The process of claim 4 wherein said stripping solution is selected from the group consisting of sulfuric acid, hydrochloric acid, phosphoric acid, perchloric acid, ammonia, sodium hydroxide, sodium carbonate, sodium bicarbonate, sodium chloride, ammonium chloride, ammonium nitrate, and mixtures thereof.

6. The process of claim 4 wherein said metal ions are selected from the group consisting of copper, cobalt, chromium (III), chromium (VI), cadmium, nickel, zinc, platinum, palladium, gold, radium, vanadium, lead, zirconium, hafnium, tin, tantalum, lanthanum, cerium, praseodymium, neodymium, promethium, samarium, europium, gadolinium, terbium, dysprosium, holmium, erbium, thulium, ytterbium, and lutetium.

7. The process of claim 4 wherein said metal ion is copper, said extractant is an oxime, and said stripping solution is sulfuric acid.

8. The process of claim 1 wherein said extractant is selected from the group consisting of anionic metal extractants, cationic metal extractants, neutral metal extractants, and mixtures thereof.

9. The process of claim 1 wherein said extractant is an oxime selected from the group consisting of ketooximes, aldooximes, and mixtures thereof.

* * * * *